United States Patent
Hong et al.

(10) Patent No.: US 10,616,932 B2
(45) Date of Patent: Apr. 7, 2020

(54) METHOD FOR CONFIGURING WIRELESS CONNECTION OF TERMINAL AND APPARATUS THEREFOR

(71) Applicant: KT CORPORATION, Gyeonggi-do (KR)

(72) Inventors: Sung-pyo Hong, Seoul (KR); Woo-jin Choi, Seoul (KR)

(73) Assignee: KT CORPORATION, Gyeonggi-do (KR)

(*) Notice: Subject to any disclaimer, the term of this patent is extended or adjusted under 35 U.S.C. 154(b) by 0 days.

(21) Appl. No.: 15/744,823

(22) PCT Filed: Jun. 20, 2016

(86) PCT No.: PCT/KR2016/006529
§ 371 (c)(1),
(2) Date: Jan. 14, 2018

(87) PCT Pub. No.: WO2017/010693
PCT Pub. Date: Jan. 19, 2017

(65) Prior Publication Data
US 2018/0213579 A1    Jul. 26, 2018

(30) Foreign Application Priority Data

Jul. 14, 2015    (KR) .................. 10-2015-0099891

(51) Int. Cl.
*H04W 4/00*    (2018.01)
*H04W 76/11*    (2018.01)
(Continued)

(52) U.S. Cl.
CPC ........ *H04W 76/11* (2018.02); *H04W 36/0072* (2013.01); *H04W 76/10* (2018.02);
(Continued)

(58) Field of Classification Search
CPC . H04W 36/0072; H04W 76/10; H04W 76/11; H04W 76/12; H04W 76/27; H04W 92/04
See application file for complete search history.

(56) References Cited

U.S. PATENT DOCUMENTS 9,614,652 B2 *    4/2017    Wager ................... H04L 5/0035
9,681,352 B2 *    6/2017    Vesely .................. H04W 76/27
(Continued)

FOREIGN PATENT DOCUMENTS

| KR | 10-2014-0137280 A | 12/2014 |
| KR | 10-2015-0050956 A | 5/2015 |
| KR | 10-2015-0055535 A | 5/2015 |
| WO | 2014/182134 A1 | 11/2014 |

OTHER PUBLICATIONS

3GPP TR 36.842 V12.0.0, "3rd Generation Partnership Project; Technical Specification Group Radio Access Network; Study on Small Cell enhancements for E-UTRA and E-UTRAN; Higher layer aspects (Release 12)", Dec. 2013, pp. 1-71.

*Primary Examiner* — Minh Trang T Nguyen
(74) *Attorney, Agent, or Firm* — IP Legal Services, LLC

(57) ABSTRACT

A method may be provided for configuring wireless connection of a terminal with a mobile communication network The method of an access unit may include transmitting, to a central unit, a first message having an uplink RRC message received from the terminal; receiving, from the central unit, a second message having a downlink RRC message; and transmitting the downlink RRC message to the terminal.

14 Claims, 17 Drawing Sheets

(51) Int. Cl.
  *H04W 76/10* (2018.01)
  *H04W 76/12* (2018.01)
  *H04W 76/27* (2018.01)
  *H04W 36/00* (2009.01)
  *H04W 92/04* (2009.01)
  *H04L 5/00* (2006.01)
  *H04W 8/26* (2009.01)

(52) U.S. Cl.
  CPC ........... *H04W 76/12* (2018.02); *H04W 76/27* (2018.02); *H04L 5/001* (2013.01); *H04L 5/0035* (2013.01); *H04W 8/26* (2013.01); *H04W 92/04* (2013.01)

(56) References Cited

U.S. PATENT DOCUMENTS

| | | | |
|---|---|---|---|
| 2015/0124748 A1* | 5/2015 | Park | H04L 5/0032 370/329 |
| 2015/0131578 A1* | 5/2015 | Baek | H04B 7/024 370/329 |
| 2015/0358866 A1* | 12/2015 | Xu | H04W 36/00 370/331 |
| 2016/0113058 A1 | 4/2016 | Jung et al. | |
| 2016/0242080 A1* | 8/2016 | Vikberg | H04W 36/0027 |

* cited by examiner

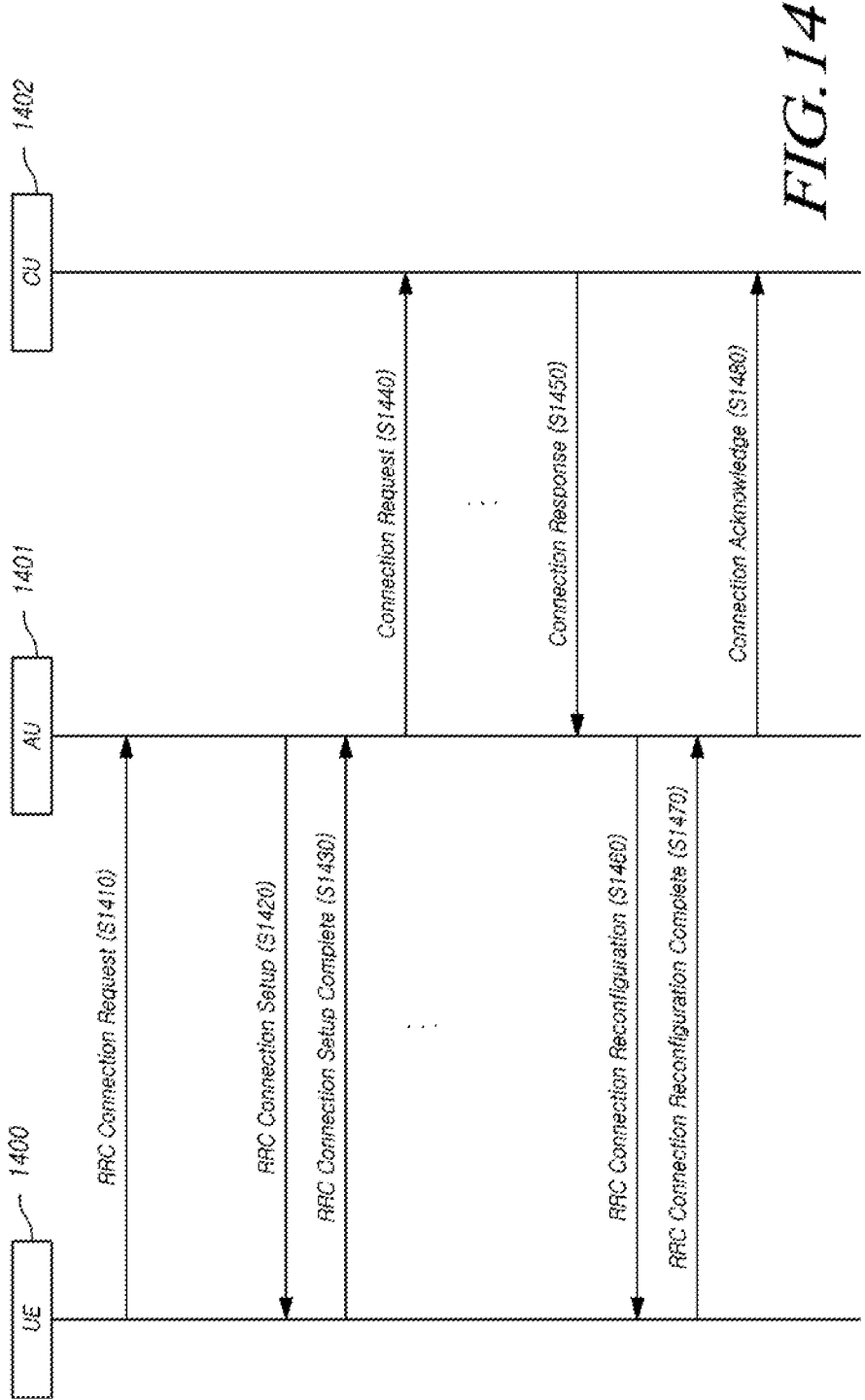

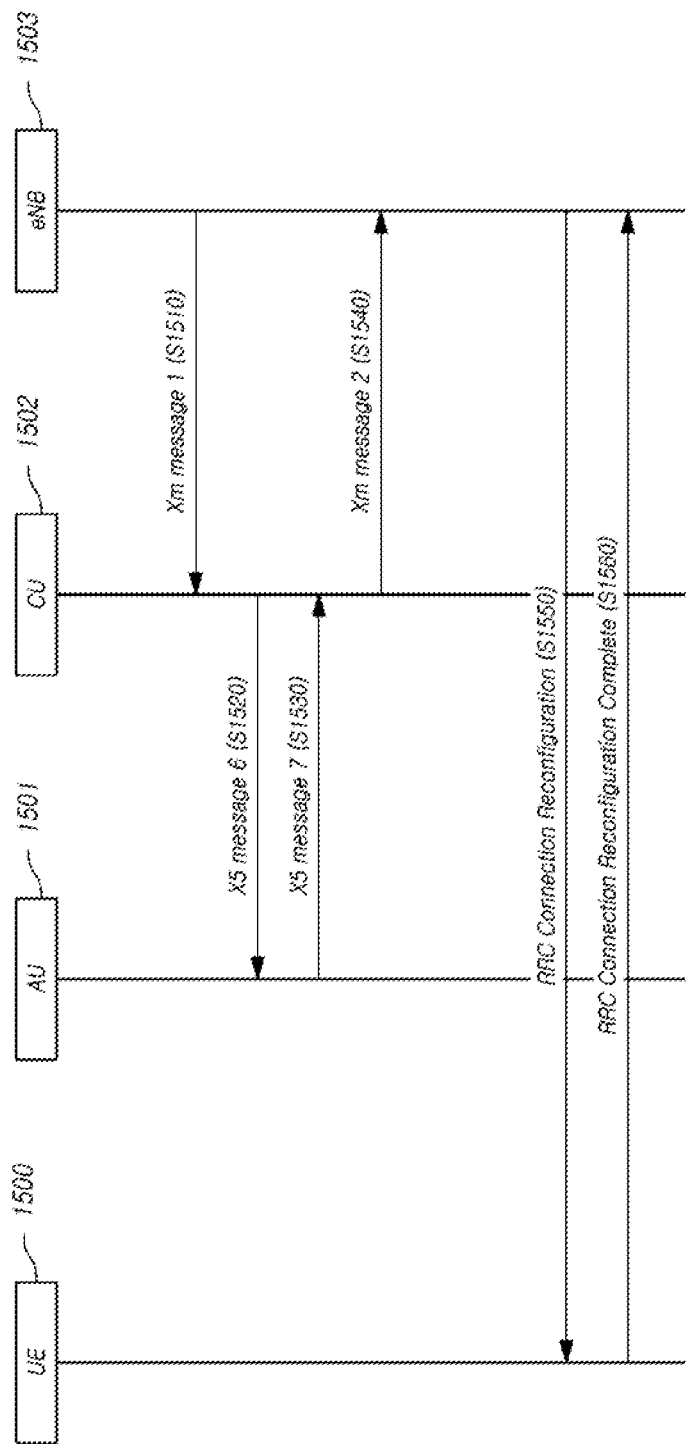

FIG.16

| LTE SRB Type | Direction | RRC message | RLC Mode |
|---|---|---|---|
| LTE SRB0 (CCCH) | Downlink | RRC Connection Setup<br>RRC Connection Reject<br>RRC Connection Re-establishment<br>RRC Connection Re-establishment reject | Transparent |
| | Uplink | RRC Connection Request<br>RRC Connection Re-establishment Request | |
| LTE SRB1 (DCCH) | Downlink | RRC Connection Reconfiguration<br>RRC Connection Release<br>Security Mode Command<br>UE Capability Enquiry<br>DL information transfer(if no SRB-2)<br>Mobility from EUTRA Command<br>Handover form EUTRA preparation request<br>CS Fallback parameter response CDMA2000<br>Counter Check | AM |
| | Uplink | RRC Connection Setup Complete<br>Security Mode Complete<br>Security Mode Failure<br>RRC Connection Reconfiguration Complete<br>RRC Connection Re-establishment Complete<br>Measurement report<br>UE Capability information<br>UL Information Transfer(if no SRB2)<br>UL handover preparation transfer<br>CS fallback parameters request CDMA2000<br>Counter Check response | |
| LTE SRB2 (DCCH) | Downlink | DL Information Transfer | |
| | Uplink | DL Information Transfer | |

US 10,616,932 B2

METHOD FOR CONFIGURING WIRELESS CONNECTION OF TERMINAL AND APPARATUS THEREFOR

CROSS REFERENCE TO RELATED APPLICATIONS

This application is a National Stage Patent Application of PCT International Patent Application No. PCT/KR2016/006529 (filed on Jun. 20, 2016) under 35 U.S.C. § 371, which claims priority to Korean Patent Application No. 10-2015-0099891 (filed on Jul. 14, 2015), the teachings of which are incorporated herein in their entireties by reference.

TECHNICAL FIELD

The present disclosure relates to a method of configuring a wireless connection of a terminal in a mobile communications network and an apparatus therefor, and more particularly, to a signaling method for radio resource control in a mobile communications network and an apparatus therefor.

BACKGROUND ART

Due to advances in communications systems, various wireless terminals have been introduced to consumers, both organizations and individuals. Current mobile communications systems have adopted technologies of the 3$^{rd}$ generation partnership project (3GPP), such as long term evolution (LTE) and LTE-Advanced. Such a mobile communications systems are high-speed and high-capacity communications systems which have grown out of voice-centric services to transmit various types of data, such as images and wireless data. Such communications systems are required to transmit a large amount of data at a high speed.

There are many studied conducted to develop technology for efficiently transmitting data using a number of cells, as a method of transmitting a large amount of data at a high speed. Thus, in a next-generation mobile communications system, referred to as 5G communications, it is expected to concentrically deploy a larger number of small cells than that of the present systems.

However, such concentric deploy of a number of small cells might cause problems in significant increments of investment costs and operation costs of base stations and cells.

Thus, there is a high demand for technology of processing a large amount of data at a high speech while reducing investment costs and operation costs for base stations and cells.

DISCLOSURE

Technical Problem

Accordingly, the present disclosure has been made while keeping the above-described problems occurring in the related art in consideration, and the present disclosure proposes an efficient wireless access network structure for reducing investment costs and operating costs for base stations and cells, and a signaling procedure therefor.

Technical Solution

According to the present disclosure, provided is a method of configuring, by an access unit, a wireless connection of a terminal. The method may include: transmitting a first message, including an uplink RRC message received from a terminal, to a central unit; receiving a second message, including a downlink RRC message, from the central unit; and transmitting the downlink RRC message to the terminal.

In addition, according to the present disclosure, provided is an access unit for configuring a wireless connection of a terminal. The access unit may include: a transmitter transmitting a first message, including an uplink RRC message received from a terminal, to a central unit; and a receiving a second message, including a downlink RRC message, from the central unit, wherein the transmitter transmits the downlink RRC message to the terminal.

Advantageous Effects

As set forth above, the present disclosure provides an efficient wireless access network structure for reducing investment and operating costs for the construction of base stations and cells.

In addition, the present disclosure provides a specific procedure for radio connection setup of terminals (e.g., user equipment) in an efficient wireless access network structure.

DESCRIPTION OF DRAWINGS

FIG. 14 illustrates a further exemplary connection procedure in the radio access network separation structure according to the present disclosure;
FIG. 15 illustrates another exemplary connection procedure in the radio access network separation structure according to the present disclosure;

FIG. 16 illustrates SRB types and RRC messages of the E-UTRAN; and

MODE FOR INVENTION

Figure 1:
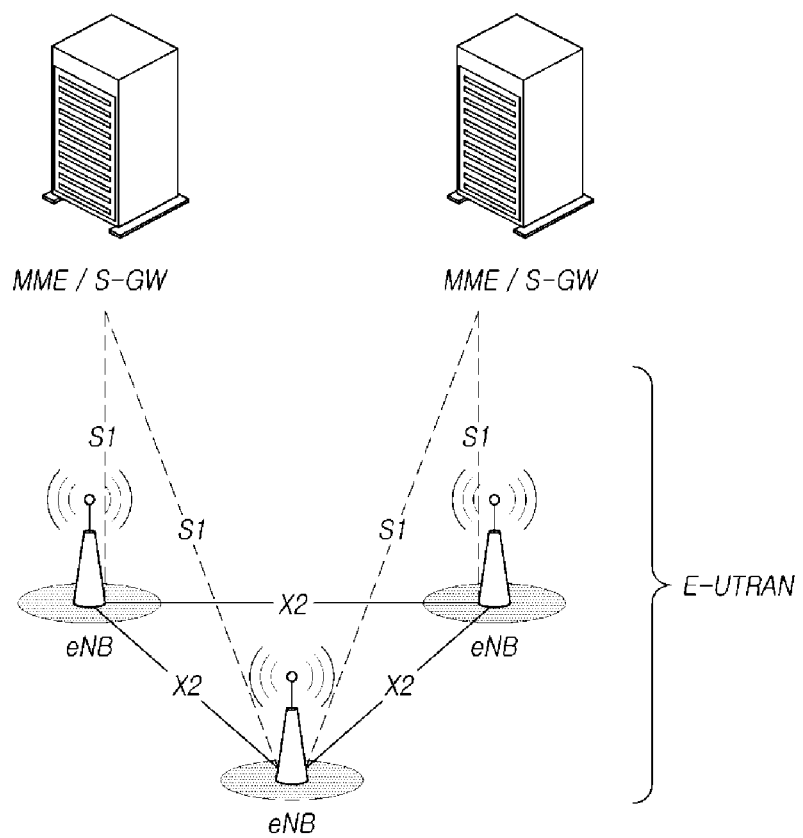
FIG. 1 illustrates E-UTRAN architecture.

Hereinafter, specific embodiments of the present disclosure will be described in detail with reference to illustrative drawings. Throughout this document, reference should be made to the drawings, in which the same reference numerals and symbols will be used to designate the same or like components. In the following description of the present disclosure, detailed descriptions of known functions and components incorporated herein will be omitted in the case that the subject matter of the present disclosure may be rendered unclear thereby.

Wireless communications systems according to the present disclosure are widely deployed to provide a range of communications services, including voice and packet data. Wireless communications systems include user equipment devices (UEs) and base stations (BSs) or evolved node Bs (eNBs). As used in the specification, the term "user equipment" should be interpreted as having a comprehensive meaning indicating a wireless communications user equipment, including not only user equipment used in wideband code division multiple access (WCDMA), long-term evolution (LTE), high-speed packet access (HSPA), and the like, but also all of a mobile station (MS), a user terminal (UT), a subscriber station (SS), a wireless device, and the like, used in the global system for mobile communications (GSM).

A base station or cell typically refers to a station that communicates with user equipment, and may also be referred to using any other term, such as a node B, an eNB, a sector, a site, a base transceiver system (BTS), an access point (AP), a relay node, a remote ratio head (RRH), a radio unit (RU), a small cell, or the like.

Herein, the base station or cell should be interpreted as being a comprehensive term indicating a partial area or function covered by a base station controller (BSC) in CDMA, a node B in WCDMA, an eNB or a sector (or site) in LTE, or the like. In addition, the base station or cell comprehensively indicates a variety of coverage areas, such as a mega cell, a macro cell, a microcell, a picocell, a femtocell, and communications ranges of a relay node, an RRH, an RU, and a small cell.

A variety of cells as stated above are controlled by base stations, respectively, which may be interpreted in two senses. Each of the base stations i) may be an apparatus itself that provides a megacell, a macrocell, a microcell, a picocell, a femtocell, or a small cell in relation to a wireless communications area, or ii) may indicate the wireless communications area itself. In i), entire apparatuses providing wireless areas, controlled by the same entity, or entire apparatuses interacting with one another to form a wireless area in a coordinated manner may refer to base stations. An eNB, an RRH, an antenna, an RU, a low power node (LPN), a point, a transceiver point, a transmission point, a reception point, and the like are used as embodiments of the base station, depending on the configuration of the wireless area. In ii), the wireless area itself in which a signal is received or transmitted may refer to a base station, in terms of a user or an adjacent base station.

Thus, the megacell, the macrocell, the microcell, the picocell, the femtocell, the small cell, the RRH, the antenna, the RU, the LPN, the point, the eNB, the transceiver point, the transmission point, and the reception point collectively refer to the base station.

Herein, the UE and the base station comprehensively refer to two types of transmission/reception entities for realizing technologies or technical concepts described herein and are not limited by terms or words that are explicitly defined. The UE and the base station are comprehensively used as two (uplink or downlink) transmission/reception entities for realizing technologies or technical concepts described herein and are not limited by terms or words that are explicitly defined. Here, the term "uplink (UL)" relates to data transmission/reception in which data is transmitted from the UE to the base station, whereas the term "downlink (DL)" relates to data transmission/reception in which data is transmitted from the base station to the UE.

There are no limitations in multiple access technologies applied to the wireless communications system. A variety of multiple access methods, such as code division multiple access (CDMA), time division multiple access (TDMA), frequency division multiple access (FDMA), orthogonal frequency division multiple access (OFDMA), OFDM-FDMA, OFDM-TDMA, and OFDM-CDMA, may be used. An exemplary embodiment of the present disclosure is applicable for the allocation of resources in asynchronous wireless communications evolving into LTE and LTE-Advanced through GSM, WCDMA, and high-speed packet access (HSPA) and synchronous wireless communications evolving into CDMA, CDMA-2000, and ultra-mobile broadband (UMB). The present disclosure should not be interpreted as being limited or restricted to a specific field of wireless communications and should be interpreted as covering all technical fields to which the concept of the present disclosure is applicable.

Uplink (UL) transmissions and downlink (DL) transmissions may employ time division duplexing (TDD) in which transmission is performed at different fractions of time or frequency division duplexing (FDD) in which a transmission is performed at different frequencies.

In addition, a system such as LTE or LTE-Advanced forms standards by forming a UL and a DL, based on a single carrier wave or a pair of carrier waves. The UL and the DL transmit control information through a control channel, such as a physical downlink control channel (PDCCH), a physical control format indicator channel (PCFICH), a physical hybrid-ARQ indicator channel (PHICH), a physical uplink control channel (PUCCH), and an enhanced physical downlink control channel (EPDCCH). In addition, the UL and the DL are constituted of a data channel, such as a physical downlink shared channel (PDSCH) or a physical uplink shared channel (PUSCH), to transmit data.

In addition, control information can be transmitted using an enhanced or extended PDCCH (EPDCCH).

Herein, the cell may refer to coverage of a signal transmitted from a transmission point or a transmission/reception point, a component carrier having the coverage of the signal transmitted from the transmission point or the transmission/reception point, or the transmission point or the transmission/reception point.

The wireless communications system to which embodiments are applied may be a coordinated multi-point transmission/reception (CoMP) system, in which two or more transmission/reception points transmit a signal in a coordinated manner, a coordinated multi-antenna transmission system, or a coordinated multi-cell communications system. The CoMP system may include at least two multi-transmission/reception points and user terminals.

The multi-transmission/reception points may be a base station or a macrocell (hereinafter referred to as an "eNB") and at least one RRH connected to the eNB via a fiber optic cable or an optical fiber to be controlled by wires. The RRH has high transmission power, or has low transmission power within the area of the macrocell.

Hereinafter, the DL refers to communications from each multi-transmission/reception point to a UE or a path for such communications. The UL refers to communications from the UE to the multi-transmission/reception point or a path for such communications. In the DL, a transmitter may be a portion of the multi-transmission/reception point, and a receiver may be a portion of the UE. In the UL, the transmitter may be a portion of the UE, and the receiver may be a portion of the multi-transmission/reception point.

Hereinafter, transmitting/receiving a signal via a channel, such as the PUCCH, PUSCH, PDCCH, EPDCCH, or physical PDSCH, may also be described as "transmitting/receiving a PUCCH, PUSCH, PDCCH, EPDCCH, or PDSCH."

In addition, hereinafter, transmitting or receiving a PDCCH or transmitting or receiving a signal on the PDCCH may refer to transmitting or receiving an EPDCCH or transmitting or receiving a signal on the EPDCCH.

That is, the PDCCH described hereinafter indicates the PDCCH or the EPDCCH, or is used in the sense of including both the PDCCH and the EPDCCH.

For convenience of description, the EPDCCH may be applied as an embodiment to the portion described as the PDCCH, and the PDCCH may be applied as an embodiment to the portion described as the EPDCCH.

In addition, higher layer signaling described hereinafter includes radio resource control (RRC) signaling to transmit RRC information including an RRC parameter.

The eNB performs DL transmission to UEs. The eNB can transmit a physical downlink shared channel (PDSCH), which is a main channel for unicast transmissions, and a physical downlink control channel (PDCCH), on which downlink control information (DCI), such as scheduling necessary for the reception of the PDSCH, and scheduling approval information for transmissions on a UL data channel (e.g. a physical uplink shared channel (PUSCH)) are transmitted. Hereinafter, the transmission of a signal on each channel will be described as the transmission of the corresponding channel.

In a situation, in which data-enabled UEs are increasing and high-speed and high-capacity processing is required, operators suffer from increasing construction and operating costs for base stations and cells for processing user data traffics.

In such environments, operators may consider a centralized cloud RAN network structure in an attempt to reduce investment and operating costs. In such a cloud RAN structure, an eNB is divided into a digital unit (DU) performing data processing of the eNB and an RF unit (RU) transmitting and receiving wireless signals. The DU may be disposed in a concentrated section, while the RU may be disposed in a remotely-located service area. The DU and the RU may be connected via an optical cable, and a specification configured by base station vendors, such as common public radio interface (PRI) or open baseband remote radio head interface (OBSAI), may be used as an interface specification for communications between the DU and the RU.

FIG. 1 illustrates E-UTRAN architecture.

In a 3GPP mobile communications network, an evolved UMTS terrestrial radio access network (E-UTRAN) includes base stations (e.g., eNBs) providing an E-UTRA user plane (PDCP/RLC/MAC/PHY) and a control plane (RRC) protocol termination to user equipments (e.g., terminals). The eNBs are connected to each other via an X2 interface. The eNBs are connected to an evolved packet core (EPC) via an S1 interface.

Figure 2:
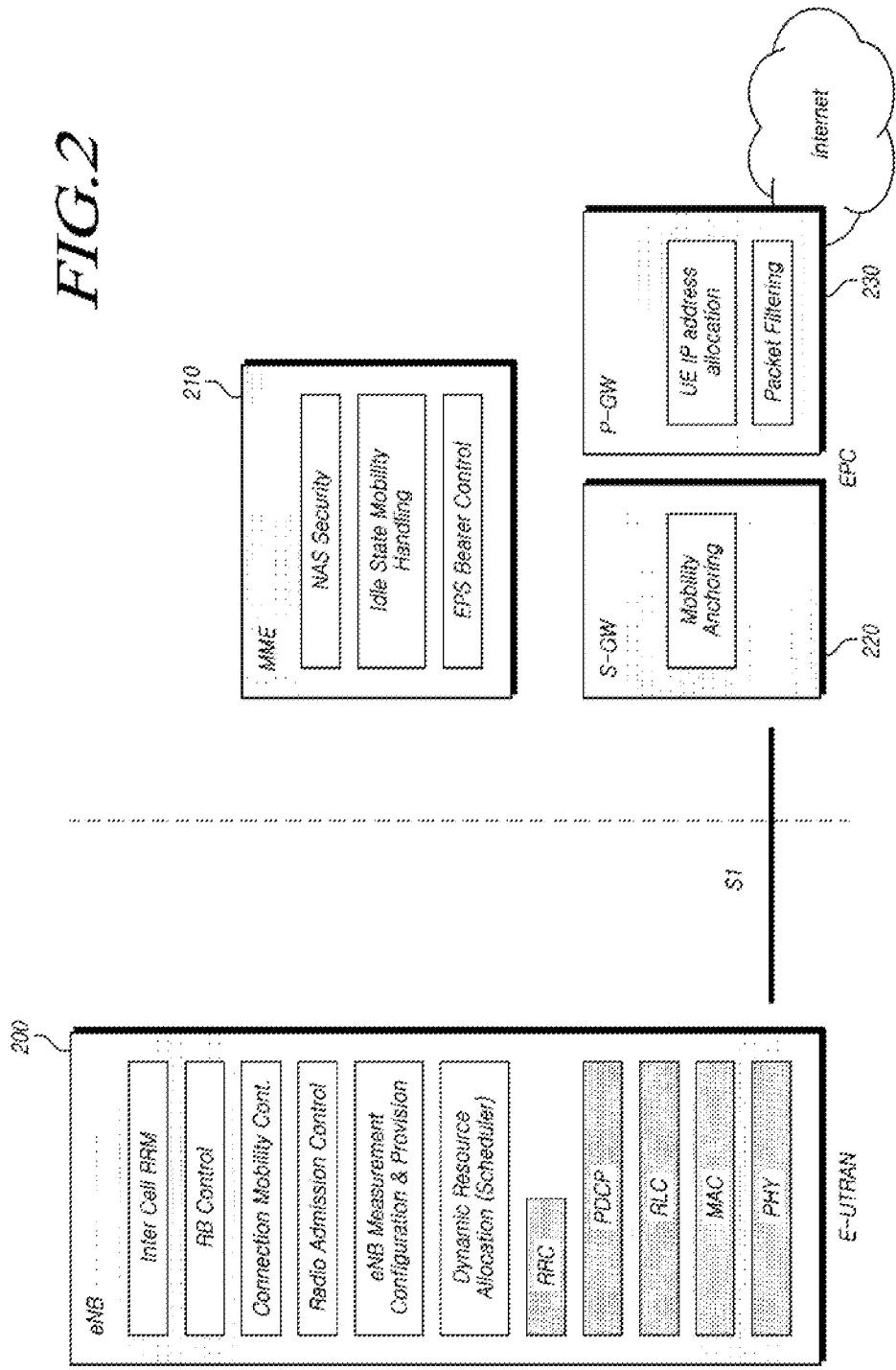
FIG. 2 illustrates the functional separation of the E-UTRAN and the EPC.

FIG. 2 illustrates functional separation of E-UTRAN and EPC.

Referring to FIG. 2, core network entities include an MME 210, an S-GW 220, and a P-GW 230. The core network entities provide corresponding core network functions, while the eNBs 200 provide radio resource management (RRM), RRC, layer-2 protocol function, and the like.

Figure 3:
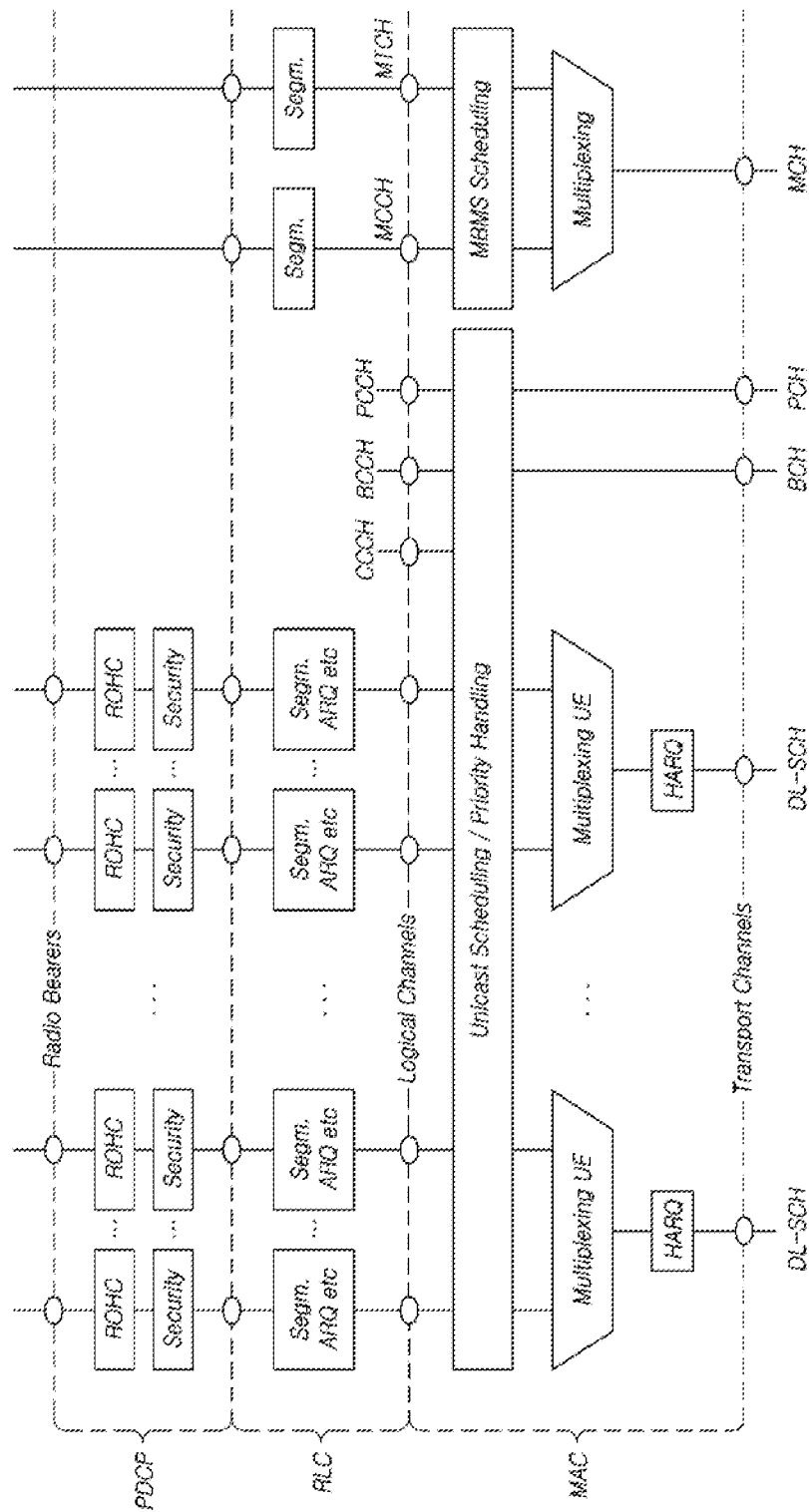
FIG. 3 illustrates a Layer 2 structure for a downlink of the E-UTRAN.

FIG. 3 illustrates a Layer 2 structure for a downlink (DL) of E-UTRAN.

Referring to FIG. 3, the Layer 2 is divided into a media access control (MAC) layer, a radio link control (RLC) layer, and a packet data convergence protocol (PDCP) sub-layer.

The E-UTRAN supports multiple bearers for each UE. Respective radio bearers (e.g., wireless bearers) of the UE are associated with logic channels, such as a downlink control channel (DCCH) or a dedicated traffic channel (DTCH), of the MAC layer via a PDCP entity and an RLC entity associated thereto. A transfer service is provided between the UE and the eNB via a logic channel associated with Layer 2 entities (e.g. the PDCP entity and the RLC entity), associated with specific traffic flows having the same characteristics. A plurality of transfer services are separately provided between the UE and the eNB.

The cloud RAN structure separating the DU and the RU advantageously reduces construction costs for cell sites. However, since all functions except for wireless transmission and reception are provided in the DU, the interface between the DU and the RU requires the rate/capacity of a backhaul (or a front haul; hereinafter, referred to as a backhaul for convenience of description) to be significantly higher than a wireless data transmission rate/capacity. In addition, it may be difficult to update the DU-RU interface, since the specification thereof is defined by eNB vendors. It is expected to continuously increasing in small cells constructed by operators, due to increases in the amount of data used or the introduction of 5G networks. In addition, it is also expected to increase backhaul costs due to increases in the wireless transmission/reception rate by the development of 5G technologies. Thus, there is a demand for developing an improved wireless access structure, different from the foregoing cloud RAN structure, as well as a method for realizing the improved structure, in order to reduce such backhaul cost.

In accordance with at least one embodiment, a cost-efficient wireless access network structure and a signaling procedure thereof may be provided for reducing backhaul costs.

Hereinafter, a variety of embodiments of a wireless access network separation structure for reducing backhaul costs will be described with reference to the accompanying drawings.

Figure 4:
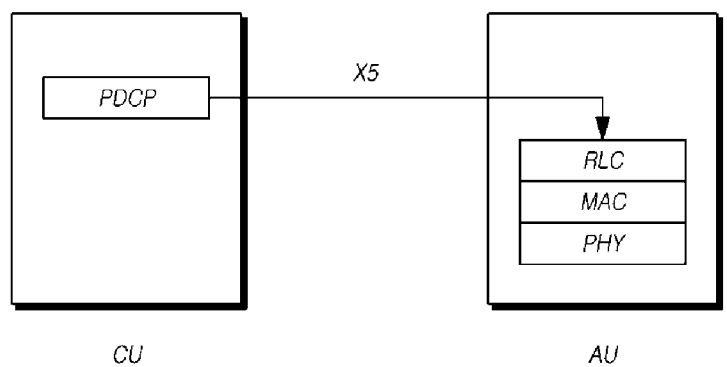
FIG. 4 illustrates an example of the wireless access network separation structure according to the present disclosure.

FIG. 4 illustrates a wireless access network separation structure according to an embodiment of the present disclosure.

As illustrated in FIG. 4, an E-UTRAN eNB of the related art may be defined as nodes providing two different functions. For example, for the transmission of user plane data, a node providing a PDCP function may be separately defined from a node providing an RLC function, a MAC function, and a PHY function.

Here, the PHY, MAC, RLC, and PDCP may be sub-layers the same as the sub-layers provided by the E-UTRAN or may be sub-layers provided by a next-generation mobile communications network rather than the E-UTRAN. These may belong to wireless access network technology for next-generation mobile communication networks. Next-generation mobile communications networks also need sub-layers for performing mapping between a logic channel and a transmission channel, as well as multiplexing/de-multiplexing, priority processing, random accessing, and the like of MAC SDUs. For convenience of description, a sub-layer performing such a function is referred to as a MAC sub-layer. In addition, next-generation mobile communications networks also need sub-layers for providing an error control function using an automatic repeat request (ARQ), concatenation segmentation, and reassembly for data, and the like. These layers will be referred to as RLC sub-layers for convenience of description. Furthermore, next-generation mobile communications networks also need sub-layers for providing header compression, ciphering, and the like, and these layers will be referred to as PDCP sub-layers for convenience of description.

The following descriptions will be given with regard to an exemplary case in which related-art E-UTRAN L2 functions are divided according to the node providing a PDCP function and the node providing an RLC function, a MAC function, and a PHY function, for the transmission of user plane data. However, this is merely for convenience of description; when sub-layers are configured by recombining the E-UTRAN L2 functions, a case in which a node providing upper L2 functions and a node providing lower L2 functions are separately defined for the transmission of user plane data should be understood as being embraced within the scope of the present disclosure.

Hereinafter, a control plane structure under the user plane structure will be described.

Functions that an RRC sub-layer provides broadcast of system information regarding an upper stratum, such as a non-access stratum (NAS); broadcast of system information regarding an access stratum (AS), paging, setup, maintenance, and cancellation of RRC connection, a security function, setup, configuration, maintenance, and cancellation of a radio bearer, a mobility function, transmission of an NAS message, and the like.

Under the user plane structure, the following control plane structure is considerable.

For example, the node providing a PDCP function for the transmission of user plane data may be allowed to provide an RRC function. An entirety or a portion of information included in an RRC message may be generated at the node providing a PDCP function for the transmission of user plane data. In this regard, it may be necessary to have signaling (or coordination, message exchange, or provision of information; hereinafter, referred to as signaling for convenience of description) between the node providing a PDCP function for the transmission of user plane data and the node providing an RLC function, a MAC function, and a PHY function for the transmission of user plane data. A final RRC message to be transferred to the UE may be generated at the node providing a PDCP function and may be transferred to the UE through the node providing an RLC function, a MAC function, and a PHY function.

In another example, the node providing an RLC function, a MAC function, and a PHY function for the transmission of user plane data may be configured to provide the RRC function. An entirety or a portion of information included in the RRC message may be generated by the node providing an RLC function, the MAC function, the PHY function for the transmission of user plane data. In this regard, signaling between the node providing a PDCP function for the transmission of user plane data and the node providing an RLC function, a MAC function, and a PHY function for the transmission of user plane data may be necessary. The final RRC message to be transferred to the UE may be generated at the node providing an RLC function, a MAC function, and a PHY function and may be directly transferred to the UE. In an example, in this regard, the RRC may include a function for performing an encryption or integrity check on control plane data. The RRC may perform an encryption or integrity check on the control plane data by itself. In another example, in this regard, the node providing an RLC function, a MAC function, and a PHY function may configure the PDCP entity for control plane data. Specifically, the node providing an RLC function, a MAC function, and a PHY function may configure the PDCP entity for the RRC. For another example, in this regard, the node providing an RLC function, a MAC function, and a PHY function may perform an encryption or integrity check on the RRC message.

For example, the node providing a PDCP function for the transmission of user plane data may provide a portion of the RRC function associated with the corresponding node (e.g. a function of generating an RRC message via the RRM), and the node providing an RLC function, a MAC function, and a PHY function for the transmission of user plane data may provide a portion of the RRC function associated with the corresponding node (e.g. a function of generating an RRC message via the RRM). In this regard, it is necessary to have signaling between the node providing a PDCP function for the transmission of user plane data and the node providing an RLC function, a MAC function, and a PHY function for the transmission of user plane data. In this case, the final RRC message to be transferred to the UE may be generated at the node providing a PDCP function and may be transferred to the UE via the node providing an RLC function, a MAC function, and a PHY function. Alternatively, the final RRC message to be transferred to the UE may be generated at the node providing an RLC function, a MAC function, and a PHY function and may be directly transferred to the UE. For example, in this regard, the RRC may include a function of performing an encryption or integrity check on the control plane data. That is, the RRC may perform an encryption or integrity check on the RRC message by itself. For another example, in this regard, the node providing an RLC function, a MAC function, and a PHY function may configure the PDCP entity for the control plane data. That is, the node providing an RLC function, a MAC function, and a PHY function may configure the PDCP entity for the RRC. In a further example, in this regard, the node providing an RLC function, a MAC function, and a PHY function may perform an encryption or integrity check for the RRC message.

Herein, for convenience of description, the node providing a PDCP function for the transmission of user plane data is referred to as a central unit (CU). In addition, the node providing an RLC function, a MAC function, and a PHY function for the transmission of user plane data is referred to as an access unit (AU). However, these terms are only used for convenience of description and the present disclosure is not limited thereto. The CU may terminate a core network interface (e.g. S1 control interface or S1 user interface). The CU may be interfaced with an entity of a core network. The CU may be included as one of user plane entities of the core network.

Herein, an interface between the CU and the AU is denoted by X5. However, this term is only used for convenience of description and the present disclosure is not limited thereto. User plane data between X5 interfaces corresponds to a data packet (e.g. PDCP PDU). Thus, an amount of backhaul data required depending on an amount of wireless user data is similar to an amount of user data. It is therefore possible to reduce backhaul costs in the related-art DU-RU cloud RAN structure, in which backhaul data, in an amount equal to 10 times an amount of user data, is required.

In the wireless access network structure according to the present disclosure, dual connectivity for high-capacity and high-speed data processing of the UE may be considered. Hereinafter, a dual connectivity structure in the wireless access network structure according to the present disclosure will be described with reference to the drawings.

Figure 5:
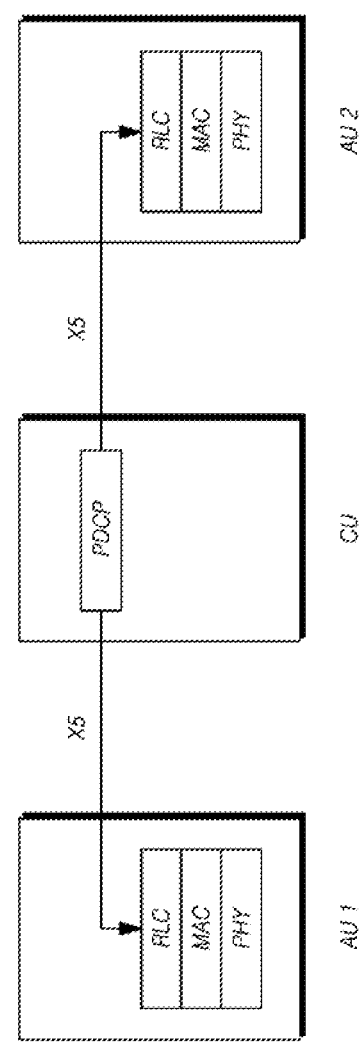
FIG. 5 illustrates an exemplary embodiment of dual connectivity in the wireless access network separation structure according to the present disclosure.

FIG. 5 illustrates dual connectivity in a wireless access network separation structure according to an embodiment of the present disclosure.

FIG. 5 illustrates the dual connectivity based on an assumption that a base station (eNB) is divided into a CU node and an AU node, as shown in FIG. 4. A specific UE may be provided with a dual connectivity structure using radio resources (e.g., wireless resources) provided via two AUs. Referring to FIG. 5, an Au for providing a PCell to a single UE or a node for constructing a cell providing an initial RRC connection may be defined as AU1. A node or an AU, rather than AU1, for providing additional radio resources to the same UE, may be defined as AU2.

Figure 6:
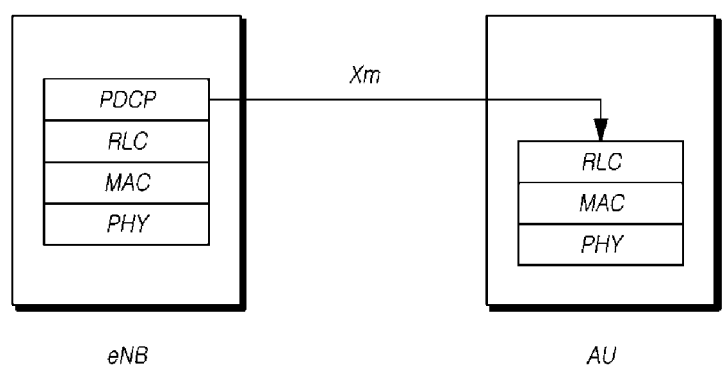
FIG. 6 illustrates another exemplary embodiment of dual connectivity in the wireless access network separation structure according to the present disclosure.

FIG. 6 illustrates dual connectivity in a wireless access network separation structure according to another embodiment of the present disclosure.

Referring to FIG. 6, AU refers to the AU of the eNB, divided into a CU node and an AU node, as illustrated in FIG. 4. For example, the AU may be a network node to which wireless access technology for next-generation mobile communications networks is applied. A specific UE may be provided with a dual connectivity structure using radio resources provided by the eNB according to related-art E-UTRAN technology and radio resources provided by the AU, i.e. a new node. In FIG. 6, an initial RRC connection may be provided to a single UE via the eNB. For example, as in a master eNB (MeNB) providing E-UTRAN dual connectivity in the related art, dual connectivity may be provided via the AU node providing additional radio resources to the eNB, which provides S1 termination, and the UE of the eNB. Here, the AU may operate similarly to a secondary eNB (SeNB) providing dual connectivity. An interface between the eNB and the AU is denoted by as Xm (or Xm-U). This term is only used for convenience of description and the present disclosure is not limited thereto.

Figure 7:
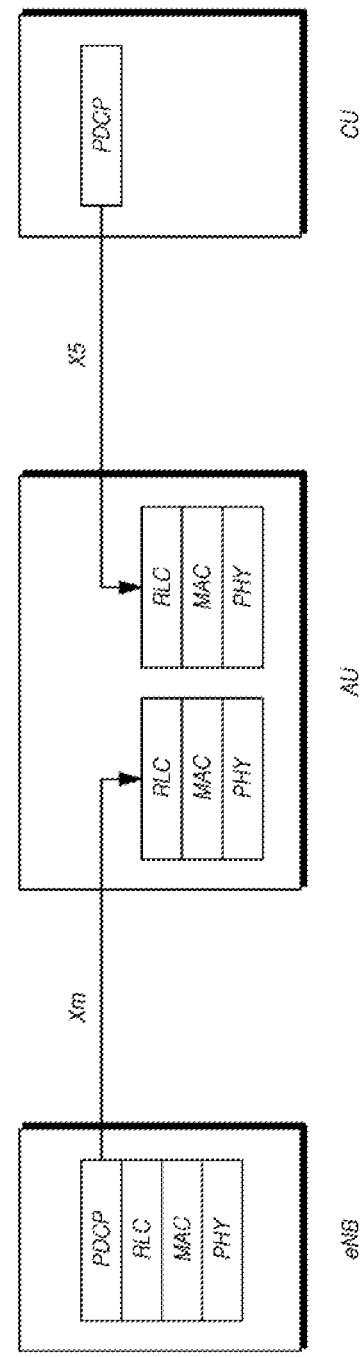
FIG. 7 illustrates a further exemplary embodiment of dual connectivity in the wireless access network separation structure according to the present disclosure.

FIG. 7 illustrates dual connectivity in a wireless access network separation structure according to still another embodiment of the present disclosure.

FIG. 7 illustrates the dual connectivity based on an assumption that the eNB is divided into the CU node and the AU node. Referring to FIG. 7, a specific UE may be provided with a dual connectivity structure using radio resources provided by the eNB and the AU. For example, an initial RRC connection may be provided to a single UE via the eNB. For example, as in a typical master eNB (MeNB) providing E-UTRAN dual connectivity, dual connectivity may be provided via the AU node providing additional radio resources to the eNB, which provides S1-MME termination, and UEs of the eNB. Here, the AU may operate similarly to the SeNB providing dual connectivity. An interface between the eNB and the AU is denoted by Xm (or Xm-A). This term is only used for convenience of description and the present disclosure is not limited thereto.

Specifically, a specific radio bearer may be provided to the UE via the eNB and the AU. The eNB may perform signaling on an interface between the eNB and the AU in order to add, modify, or cancel a radio bearer to, in, or from the UE, where the radio bearer is supposed to be transmitted via the eNB and the AU. Alternatively, the eNB may perform signaling on an interface between the eNB and the CU in order to add, modify, or cancel the radio bearer to, in, or from the UE, where the radio bearer is supposed to be transmitted via the eNB and the AU. That is, when the eNB requests that the CU add radio resources, the CU may respond to the eNB by performing CU-AU signaling on the CU-AU interface in order to add radio resources.

Otherwise, a specific radio bearer may be provided to a specific UE via the CU and the AU. The radio bearer provided via the CU and the AU may allow a core network user plane interface to be terminated via the CU. The eNB may perform signaling on the interface between the eNB and the AU in order to add, modify, or cancel a radio bearer to, in, or from the UE, where the radio bearer is supposed to be transmitted via the CU and the AU. Alternatively, the eNB may perform signaling on an interface between the eNB and the CU in order to add, modify, or cancel the radio bearer to, in, or from the UE, where the radio bearer is supposed to be transmitted via the CU and the AU. That is, the eNB requests that the CU add radio resources (or when the CU accepts the request), the CU may respond to the eNB by performing CU-AU signaling on the CU-AU interface in order to add radio resources.

Otherwise, in FIG. 7, dual functions (i.e. both the RRC function of the E-UTRAN and the RRC function of the CU) may be provided to a single UE. That is, in a specific situation, the UE may transfer RRC signaling via a radio link (e.g., wireless link) of the E-UTRAN eNB or a radio link provided via the AU (or the CU/AU).

Figure 8:
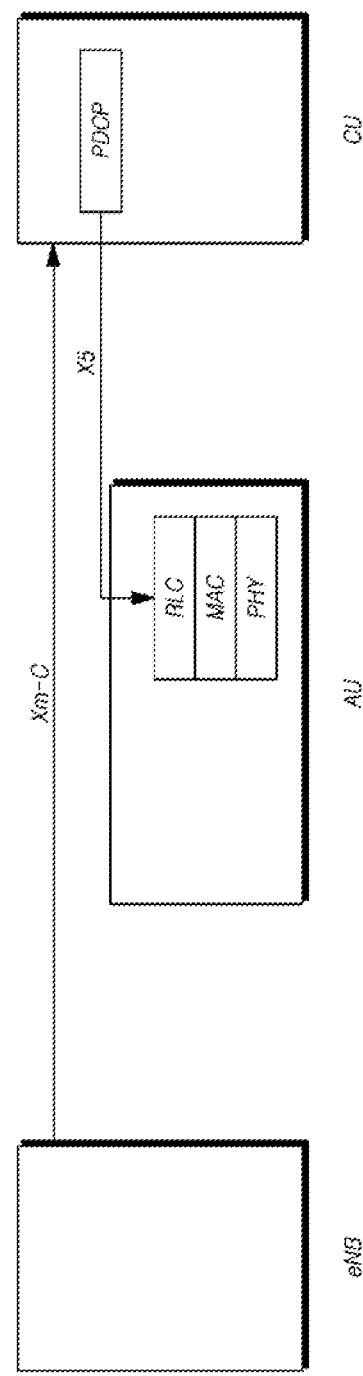
FIG. 8 illustrates another exemplary embodiment of dual connectivity in wireless access network separation structure according to the present disclosure.

FIG. 8 illustrates dual connectivity in the wireless access network separation structure according to further another embodiment of the present disclosure.

FIG. 8 illustrates the dual connectivity based on an assumption that the eNB is divided into the CU node and the AU node, as illustrated in FIG. 4. A specific UE may be provided with a dual connectivity structure using radio resources provided by the eNB and the AU. For example, in FIG. 8, an initial RRC connection may be provided to the UE via the eNB. That is, as in the MeNB providing E-UTRAN dual connectivity, dual connectivity may be provided via the AU node providing additional radio resources to the eNB, which provides S1-MME termination, and the UE of the eNB. Here, the AU may operate similarly to the SeNB providing dual connectivity. An interface between the eNB and the CU is denoted by Xm-C. This term is only used for convenience of description and the present disclosure is not limited thereto.

In an example, a signaling radio bearer may be configured to be provided to the UE only via the eNB.

For another example, a specific radio bearer may be provided to the UE via the CU and the AU. The radio bearer provided via the CU and the AU may terminate the core network user plane interface via the CU. The eNB may perform signaling on an interface Xm-A between the eNB and the Au in order to add, modify, or cancel the radio bearer to, in, or from the UE, where the radio bearer is supposed to be transmitted via the CU and the AU. Alternatively, the eNB may perform signaling on an interface Xm-C between the eNB and the CU in order to add, modify, or cancel the radio bearer to, in, or from the UE, where the radio bearer is supposed to be transmitted via the CU and the AU. That is, when the eNB requests that the CU add radio resources (or when the CU accepts the request), the CU may respond to the eNB by performing CU-AU signaling on the CU-AU interface in order to add radio resources.

For another example, in FIG. 7, dual functions (i.e. both the RRC function of the E-UTRAN and the RRC function of the CU) may be provided to the UE. That is, in a specific situation, the UE may transfer RRC signaling via a radio link of the E-UTRAN eNB or a radio link provided via the AU (or the CU/AU).

Figure 9:
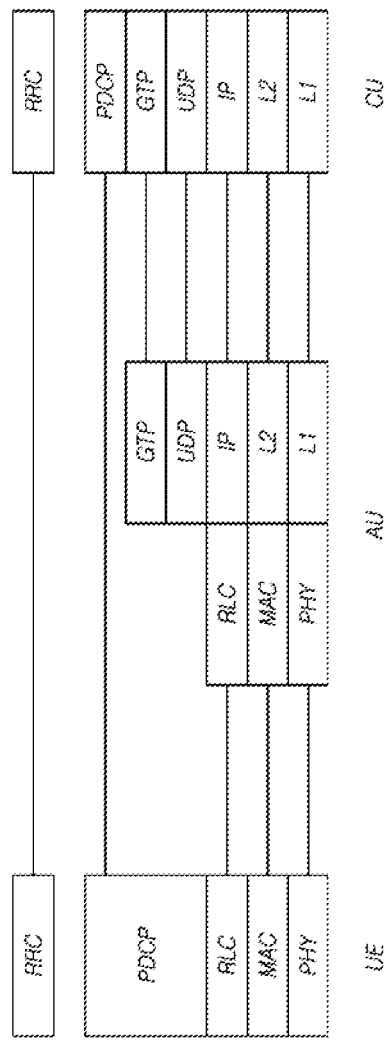
FIG. 9 illustrates an exemplary embodiment of a protocol structure in the separation of the wireless access network according to the present disclosure.

FIG. 9 illustrates a protocol structure in separation of a wireless access network according to an embodiment of the present disclosure.

For efficient data transfer, the CU and the AU may be connected via a transport network, such as a dedicated line, an Ethernet, or an internet protocol (IP) network. The transport network may be configured by GTP tunneling or any type of tunneling based on header encapsulation (where GTP stands for general packet radio service (GPRS) tunneling protocol). As described above, for the transmission of user plane data, the CU node providing a PDCP function and the AU node providing an RLC function, a MAC function, and a PHY function are divided. Like a function of generating a final RRC message, the RRC function on the control plane may be provided by the CU, as illustrated in FIG. 9, or by the AU, as illustrated in FIG. 10.

Figure 10:
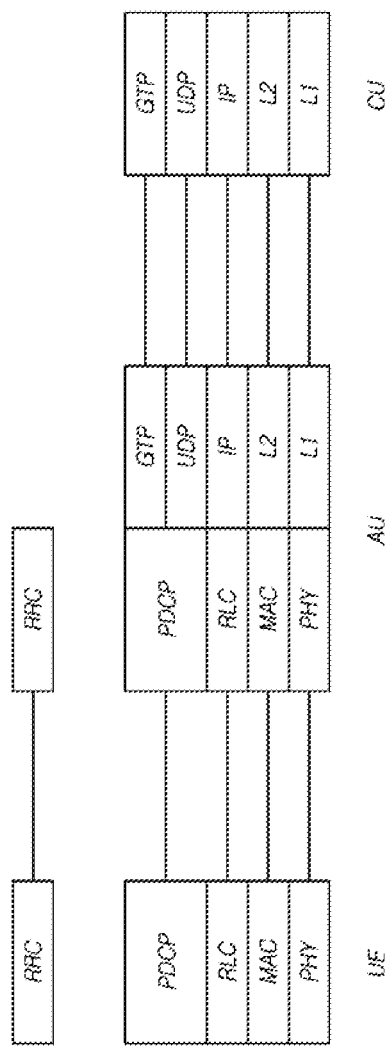
FIG. 10 illustrates another exemplary embodiment of a protocol structure in the separation of the wireless access network according to the present disclosure.

FIG. 10 illustrates a protocol structure in separation of a wireless access network according to another embodiment of the present disclosure.

As illustrated in FIG. 10, the AU may include the RRC function for the transmission of control plane data and the PDCP function for the transmission of a corresponding signaling radio bearer (SRB). In addition, the AU may receive RRC information, associated with the CU, from the CU.

A signaling method for radio (e.g., wireless) resource control is required for the UE to transmit data or to be connected to a wireless network in the embodiments described above with reference to FIGS. 4 and 5. In addition, a signaling method for radio resource control is required for the UE, connected to a wireless network (e.g. a connected UE), to transmit wireless data via the CU and the AU or to configure a wireless bearer provided via the CU and the AU, in the embodiments described above with reference to FIGS. 7 and 8.

For example, it may necessary to define an RRC signaling method of generating a final RRC message by the CU and transmitting and receiving the RRC message by the AU. For another example, it may be necessary to define a signaling method of generating the final RRC message by the AU and transmitting and receiving associated RRC information (or RRC information of the related-art E-UTRAN) via the CU. For further another example, it may be necessary to define a signaling method of generating the final RRC message by the CU or the AU and transmitting and receiving associated RRC information by signaling between the CU and the AU. These methods will be described as follows.

A MAC layer provides a data transmission service to respective logic channels defined by the type of information transmission. Examples of a logic channel, a signal bearer, and a data bearer provided by the E-UTRAN will be described as follows. These are used for convenience of description, and the present disclosure may be equally applied to a logic channel, a signal bearer, and a data bearer provided by wireless access network technology for next-generation mobile communications networks, which will be specified after 3GPP Release-14.

In the E-UTRAN, BCCH, PCCH, and CCCH logic channels may be transmitted or received in a non-UE-specific manner. In contrast, the DCCH and the DTCH may be transmitted and received in a UE-specific manner.

The broadcast control channel (BCCH) is a downlink channel for broadcasting system control information. The BCCH is generated in the RRC layer and is transferred to and processed in the MAC layer. The BCCH is used to broadcast system information transferred regardless of the UE. Thus, the BCCH may be transmitted via a corresponding cell associated with the AU by configuring a static connection (or tunnel) between the CU and the AU or via a message on the CU-AU interface. Alternatively, when the BCCH transmission is triggered at the CU, the BCCH may be transmitted via the corresponding cell associated with the AU by dynamically setting up a tunnel between the CU and the AU.

For example, the CU may generate an entirety or a portion of system information and broadcast the entirety or portion of system information via the cell associated with the AU. For another example, the CU may generate system information associated therewith, or to be generated thereby, and transfer the generated system information to the AU. The AU may broadcast system information, associated therewith or generated thereby, via the cell associated with the AU, together with system information received from the CU. For further another example, the AU may receive system information, associated with the CU or generated by the CU, from the CU and broadcast the received system information, together with system information generated thereby, in order to broadcast system information of the cell associated therewith.

The paging control channel (PCCH) for transmitting paging information and a system information change notification may be processed in the same manner as the BCCH. For example, the PCCH may be transmitted by configuring a static CU-AU connection or may be transmitted via the corresponding cell, associated with the AU, via a message on the CU-AU interface. For another example, when the PCCH is triggered at the CU, the PCCH may be transmitted via the corresponding cell associated with the AU by dynamically setting up a tunnel between the CU and the AU.

The common control channel (CCCH) carrying the SRB0 may be processed in a similar manner. For example, a static AU-CU connection may be configured, and the CCCH, received via the cell associated with the AU in response to the UE transmitting the CCCH, may be transferred to the CU. The CCCH, generated by the CU, may be transmitted to the UE via the cell associated with the AU by configuring a static CU-AU connection or using a message on the CU-AU interface. For another example, when the CCCH message is received via the cell associated with the AU in response to the CCCH transmission of the UE, the CCCH message may be transmitted to the CU by setting up a dynamic AU-CU tunnel and/or using a message on the CU-AU interface. When the CCCH message is generated by the CU, the CCCH message may be transmitted to the UE via the cell associated with the AU by setting up a dynamic tunnel and/or using a message on the CU-AU interface.

For the DCCH for transmitting UE-specific dedicated information, such as dedicated control information, between the UE and the network, or the DTCH for transmitting user plane information between the UE and the network, separate transmission specific to the UE or the radio bearer between the CU and the AU or between the AU and the CU. In this regard, dynamic signaling between the CU and the AU or between the AU and the CU is required in the procedure of adding, modifying, or canceling the radio bearer to, in, or from any UE.

Figure 11:
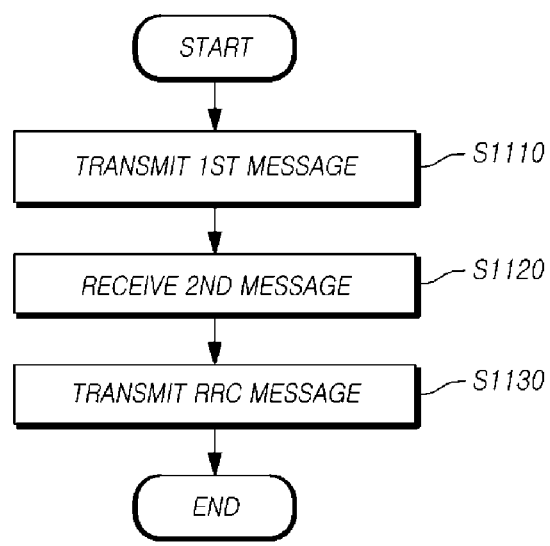
FIG. 11 illustrates the operation of an access unit according to an exemplary embodiment of the present disclosure.

FIG. 11 illustrates operations of an access unit according to an exemplary embodiment of the present disclosure.

A method of configuring, by an access unit, a wireless connection of a UE according to an exemplary embodiment of the present disclosure includes: transmitting a first message, including an UL RRC message received from a UE, to a central unit; receiving a second message, including a DL RRC message, from the central unit; and transmitting the DL RRC message to the UE.

Referring to FIG. 11, in step S1110, the access unit transmits the first message, including the UL RRC message received from the UE, to the central unit. In embodiments of the present disclosure, the access unit refers to the node providing an RLC function, a MAC function, and a PHY function for the transmission of user plane data, as described above. In addition, the central unit refers to the node providing a PDCP function for the transmission of user plane data. The first message refers to information that the AU transmits to the CU. The first message may include an RRC message received from the UE. As will be described hereinafter in respective embodiments, the first message may include information regarding RRC connection of the UE and RRC connection reconfiguration. In addition, the first message may include UE identification information or radio bearer identification information, based on which the central unit separately transmits data according to the radio bearers.

In step S1120, the access unit receives the second message, including the DL RRC message, from the central unit. The access unit may receive the second message, including the DL RRC message to be transmitted to the UE, from the central unit. The DL RRC message includes information that the AU transmits to the UE. For example, the second message may include information related to RRC connection setup or RRC connection reconfiguration. Alternatively, the second message may include UE identification information or radio bearer identification information, based on which the access unit separately transmits data according to the radio bearers. Alternatively, when the central unit generates radio resource configuration information of the UE, the second message may include the radio resource configuration information of the central unit. The radio resource configuration information of the central unit may include RRC configuration information associated with the central unit. Alternatively, the radio resource configuration information of the central unit may further include at least one information among radio bearer-specific header compression configuration information, PDCP sequence number configuration information, and PDCP configuration information. This consequently allows the UE to configure a radio connection using RLC, MAC, and PHY configuration information of the access unit.

In step S1130, the access unit transmits the DL RRC message to the UE. The access unit may transmit the received DL RRC message to the UE using a radio link. The RRC message transmitted to the UE may include the DL RRC message received from the central unit. The DL RRC message transmitted to the UE may further include information generated by the access unit.

Hereinafter, a connection procedure according to embodiments of the present disclosure will be described with reference to the drawings.

Figure 12:
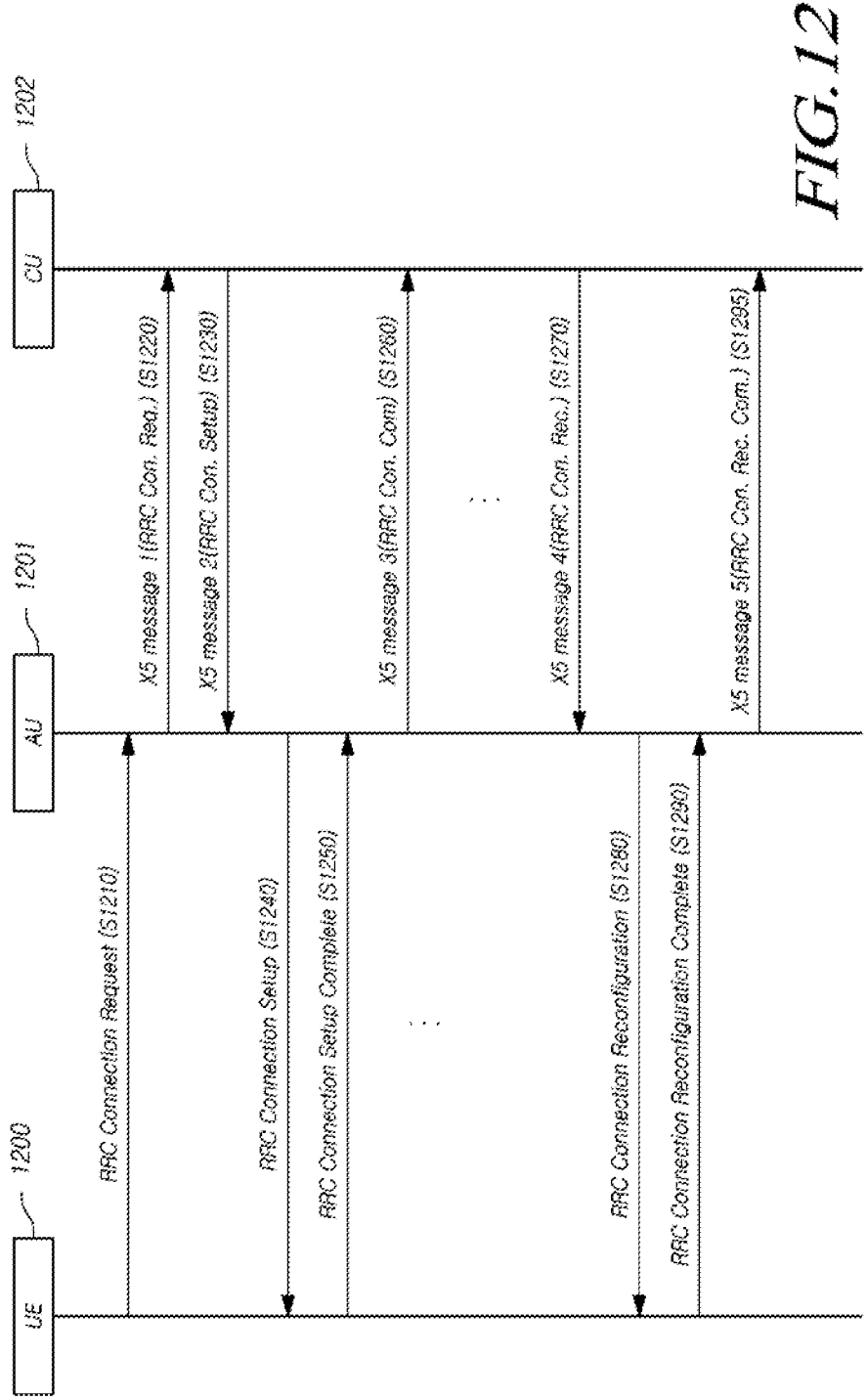
FIG. 12 illustrates an exemplary connection procedure in the radio access network separation structure according to the present disclosure.

FIG. 12 illustrates an exemplary connection procedure in a radio access network separation structure according to an embodiment of the present disclosure.

Referring to FIG. 12, an exemplary RRC connecting procedure in the above-described radio access network separation structure will be described. This embodiment relates to a method of generating, by a CU 1202, a final RRC message and transmitting and receiving, by the CU 1202, an RRC message via an AU 1201.

During an idle mode of a UE 1200, when an upper layer requests RRC connection setup, the UE 1200 starts an RRC connection setup procedure. In S1210, the UE 1200 transmits an RRC connection request message to the AU 1201.

When the RRC connection request message is received, the AU 1201 may transmit the received RRC connection request message to the CU 1202.

For example, when the RRC connection request message is received, the AU 1201 may transmit the RRC connection request message to the CU 1202 via a message on an interface between the AU 1201 and the CU 1202 (e.g. X5 message 1 in FIG. 12), instead of including a separate UE identifier in the RRC connection request message.

For another example, the AU 1201 allocates a UE identifier (e.g. an AU UE X5AP ID) based on which the UE is identified between the AU 1201 and the CU 1202. The AU 1201 may transmit the allocated identifier, by including the allocated identifier in a message (e.g. X5 message 1 in FIG. 12), on the interface between the AU 1201 and the CU 1202 by which the RRC connection request message is transferred. Alternatively, the AU 1201 may transmit a UE identifier (e.g. a cell radio network temporary identifier (C-RNTI)), by including the UE identifier in a message (e.g. X5 message 1 in FIG. 12), on the interface between the AU 1201 and the CU 1202 by which the RRC connection request is transferred.

In S1230, the CU 1202 transmits an RRC connection setup message including radio bearer configuration information (e.g. radioResourceConfigDedicated regarding SRB1 configured by the UE and/or entity configuration information regarding entities configured by the AU 1201 with regard to SRB1) to the AU 1201. The CU 1202 allocates a UE identifier (e.g. a CU UE X5AP ID) based on which the UE is identified between the CU 1202 and the AU 1201. In addition, the CU 1202 sends the RRC connection setup message, by including the RRC connection setup message in a message (e.g. X5 message 2 in FIG. 12), on the interface between the AU 1201 and the CU 1202. Alternatively, the CU 1202 sends a UE identifier (e.g. a C-RNTI), by including the UE identifier in a message (e.g. X5 message 2 in FIG. 12), on the interface between the CU 1202 and the AU 1201 by which the RRC connection setup message is transferred. In addition, the message, carrying the RRC connection setup message, on the interface between the CU 1202 and the AU 1201, may include a transport layer address or a GPRS tunneling protocol-tunnel endpoint identifier (GTP-TEID) in order to distinguish the above-described radio bearer configuration information (e.g. radioResourceConfigDedicated regarding SRB1 configured by the UE and/or entity configuration information regarding entities configured by the AU 1201 with regard to SRB1). Alternatively, the message may include at least one information among a transport layer address, tunnel identification information, a C-RNTI, a bearer ID (e.g. an E-RAB ID), and logic channel identifier, which allow transmission and reception to be separately performed according to the radio bearers. Otherwise, tunnel identification information, based on which the RRC message generated by the CU 1202 is mapped to and/or associated with an RLC entity of the corresponding radio bearer via the signaling radio bearer SRB1, may be included.

The AU 1201 configures a corresponding entity (e.g. an RL entity, a MAC entity, or PHY configuration information) according to configuration information regarding entities configured by the AU 1201 with regard to SRB1.

In S1240, the AU 1201 transmits the RRC connection setup message to the UE 1200.

The UE 1200 performs a radio resource configuration procedure according to the received radio bearer configuration information.

The UE 1200 enters an RRC connected state.

In S1250, the UE 1200 transmits an RRC connection setup complete message to the AU 1201.

In S1260, the AU 1201 transmits the RRC connection setup complete message, received via the signaling radio bearer SRB1, by including the RRC connection setup complete message in a message (e.g. X5 message 3 in FIG. 12), on the interface between the CU 1202 and the AU 1201. For another example, when the RRC connection setup complete message is received via a Layer-2 entity of the above-described signaling radio bearer SRB1, the AU 1201 sends the RRC connection setup complete message, by including the RRC connection setup complete message in a message (e.g. X5 message 3 in FIG. 5), on the interface between the CU 1202 and the AU 1201. For further example, when the RRC connection setup complete message is received, the AU 1201 sends the RRC connection setup complete message, by including the RRC connection setup complete message in a message (e.g. X5 message 3 in FIG. 5), on the interface between the CU 1202 and the AU 1201. For another example, when an RRC message included in the signaling radio bearer SRB1 is received, the AU 1201 sends the RRC message, by including the RRC message in a message (e.g. X5 message 3 in FIG. 5), on the interface between the CU 1202 and the AU 1201.

For example, the message including the RRC connection setup complete message, on the interface between the CU 1202 and the AU 1201, includes a transport layer address or a GTP-TEID to distinguish the radio bearer of the corresponding UE (e.g. the above-described signaling beater). For another example, the message including the RRC connection setup complete message, on the interface between the CU 1202 and the AU 1201, may include at least one information among a transport layer address, tunnel identification information, a C-RNTI, a bearer ID (e.g. an E-RAB ID), and a logic channel identifier, which allow transmission and reception to be separately performed according to the radio bearers, in order to distinguish the radio bearer (e.g. above-described signaling beater) of the corresponding UE. For further another example, the message including the RRC connection setup complete message, on the interface between the CU 1202 and the AU 1201, may include tunnel identification information, based on which an RRC message received via the signaling radio bearer (i.e. SRB1) is mapped to and/or associated with an RLC entity of the corresponding radio bearer. The CU 1202 may separately receive the RRC connection setup complete message based on the TEID, tunnel identification information, UE identification information, or bearer identification information of the signaling radio bearer (i.e. SRB1).

When user plane data information (e.g. E-RAB information or post Release-14 bearer information) is received from a core network node, in S1270, the CU 1202 may transmit an RRC connection reconfiguration message to an RLC entity, mapped to and/or associated with the corresponding SRB1 radio bearer in the AU 1201, via a tunnel mapped to and/or associated with the above-described SRB1 radio bearer. The RRC connection reconfiguration message includes data radio bearer (DRB) configuration information of the UE 1200 (e.g. DRB radioResourceConfigDedicated and/or entity configuration information regarding entities configured by the AU 1201 with regard to SRB2).

The message (e.g. X5 message 4 in FIG. 12), carrying the RRC connection reconfiguration message between the CU 1202 and AU 1201, may include UE identifiers (a CU UE X5AP ID and an AU UE X5AP ID) and E-RAB-specific (or data radio bearer-specific) radio bearer configuration information (DRB radioResourceConfigDedicated and/or entity configuration information regarding entities configured by the AU 1201 with regard to DRB). In addition, the message, carrying the RRC connection reconfiguration message between the CU 1202 and AU 1201, may include at least one information among a radio bearer-specific transport layer address, a GTP-TEID (in an example, a transport layer address and a radio bearer-specific GTP-TEID, or in another example, a radio bearer-specific transport layer address and a radio bearer-specific GTP-TEID), a C-RNTI, a bearer ID (e.g. an E-RAB ID), and a logic channel identifier, based on which the corresponding radio bearer is distinguished.

Alternatively, after the security is activated, the CU 1202 may transmit the RRC connection reconfiguration message, including signaling radio bearer configuration information (e.g. radioResourceConfigDedicated regarding SRB2 and/or entity configuration information regarding entities configured by the AU 1201 with regard to SRB2), to the UE 1200 via the AU 1201. The message, carrying the RRC connection reconfiguration message between the CU 1202 and the AU 1201, may include a UE identifier and signaling radio bearer configuration information (SRB2 radioResourceConfigDedicated), as well as at least one information among a transport layer address, a GTP-TEID (in an example, a transport layer address and each GTP-TEID, or in another example, each transport layer address and each GTP-TEID), a C-RNTI, a bearer ID (e.g. an E-RAB ID), and a logic channel identifier, based on which the corresponding radio bearer is distinguished. Alternatively, the message, carrying the RRC connection reconfiguration message between the CU 1202 and the AU 1201, may include at least one information among a transport layer address, tunnel identification information, a C-RNTI, a bearer ID (e.g. an E-RAB ID), and a logic channel identifier, which allow transmission or reception to be separately performed according to the radio bearers. Alternatively, the message, carrying the RRC connection reconfiguration message between the CU 1202 and the AU 1201, may further include tunnel identification information, based on which data generated by the CU 1202 is mapped and/or associated between an RLC entity, mapped to and/or associated with the above-described radio bearer (DRB or SRB2), and a PDCP entity, via the radio bearer.

The AU 1201 configures a corresponding entity (e.g. RLC entity, MAC entity, or PHY configuration information) according to entity configuration information regarding entities configured by the AU 1201 with regard to DRB or SRB2.

In S1280, the AU 1201 transmits an RRC connection reconfiguration message to the UE 1200.

The UE performs a radio resource configuration procedure according to the received radio bearer configuration information.

In S1290, the UE transmits an RRC connection reconfiguration complete message to the AU 1201.

In S1295, the AU 1201 transmits the RRC connection reconfiguration complete message, received via the signaling radio bearer SRB1, by including the RRC connection reconfiguration complete message in a message (e.g. X5 message 5 in FIG. 12), on the interface between the CU 1202 and the AU 1201. Alternatively, when the RRC connection reconfiguration complete message is received via the Layer-2 entity of the signaling radio bearer SRB1, the AU 1201 may transmit the RRC connection reconfiguration complete message, by including the RRC connection reconfiguration complete message in a message (e.g. X5 message 5 in FIG. 12), on the interface between the CU 1202 and the AU 1201. Alternatively, when the RRC connection reconfiguration complete message is received, the AU 1201 may transmit the RRC connection reconfiguration complete message, by including the RRC connection reconfiguration complete message in a message (e.g. X5 message 5 in FIG. 12), on the interface between the CU 1202 and the AU 1201. Alternatively, when an RRC message included in the signaling radio bearer SRB1 is received, the AU 1201 may transmit the RRC message, by including the RRC message in a message (e.g. X5 message 3 or X5 message 5 in FIG. 12), on the interface between the CU 1202 and the AU 1201.

The message including the RRC connection reconfiguration complete message, on the interface between the CU 1202 and the AU 1201, may include a transport layer address or a GTP-TEID to distinguish the radio bearer (e.g. DRB or SRB2, as described above) of the corresponding UE. Alternatively, to distinguish the radio bearer (e.g. DRB or SRB2, as described above) of the corresponding UE, the message including the RRC connection reconfiguration complete message, on the interface between the CU 1202 and the AU 1201, may include at least one information among a transport layer address, tunnel identification information, a C-RNTI, a bearer ID (e.g. an E-RAB ID), and a logic channel identifier, which allow transmission and reception to be separately performed according to the radio bearers. Alternatively, the message including the RRC connection reconfiguration complete message, on the interface between the CU 1202 and the AU 1201, may include tunnel identification information for mapping and/or associating user plane data or control plane data, received via the radio bearer (DRB or SRB2) to and/or with an RLC entity of the radio bearer.

The CU 1202 may separately receive data regarding the corresponding radio bearer, based on the TEID or tunnel identification information, UE identification information, or bearer identification information of the radio bearer (DRB or SRB2).

Hereinafter, a connection procedure according to another embodiment will be described with reference to FIG. 12.

An SRB0 RRC message may indicate a signaling message, such as an RRC connection request message or an RRC connection setup message, transmitted in a non-UE-specific manner before being RRC-connected.

In S1220 and S1230, the SRB0 RRC message may be transferred by being included in a message on the CU-AU interface. Alternatively, the SRB0 RRC message may be transferred on an X5 message, by including a static or dynamic tunneling configuration. For example, in the process in which the AU 1201 transfers the RRC connection setup message to the CU 1202, on the X5 interface between the AU 1201 and the CU 1202, UE identification information or bearer identification information (e.g. UP SRB1 tunnel identification information (TEID)) may be transferred.

In addition, an SRB1 RRC message may indicate a signaling message, such as an RRC connection setup complete message, an RRC connection reconfiguration message, or an RRC connection reconfiguration complete message, which is transferred in an RRC-connected state, in a UE-specific manner.

In S1260, the AU 1201 may transmit the RRC connection setup complete message to the CU 1202 via the UL SRB1 tunnel.

In the process of transferring the RRC connection setup complete message to the CU 1202, by the AU 1201, on the X5 interface between the AU 1201 and the CU 1202, UE identification information or bearer identification information (e.g. UP SRB1 tunnel identification information (TEID)) may be transferred.

In S1270, in the process of transferring the RRC connection reconfiguration message to the AU 1201, by the CU 1202, on the X5 interface between the AU 1201 and the CU 1202, UE identification information and identification information regarding respective bearers (e.g. UL tunnel identification information (TEID) regarding respective DRBs and SRB2) may be transferred.

In S1295, in the process of transferring the RRC connection reconfiguration complete message to the CU 1202, by the AU 1201, on the X5 interface between the AU 1201 and the CU 1202, UE identification information and identification information regarding respective bearers (e.g. UL tunnel identification information (TEID) regarding respective DRBs and SRB2) may be transferred.

An entirety or a portion of information included in the RRC message may be generated by the CU 1202. In contrast, an entirety or a portion of information included in the RRC message may be generated in the AU 1201.

For example, the CU 1202 may be configured to generate all of radio resource configuration information associated with the CU 1202 (or RRC information elements for CU; hereinafter, referred to as "RRC_CU_part" for convenience of description) and radio resource configuration information associated with the AU 1201 (or RRC information elements for AU 1201; hereinafter, referred to as "RRC_AU_part" for convenience of description), included in the RRC message.

In this regard, X5 message 1 or X5 message 3 in FIG. 12 may carry assistance information, based on which the CU 1202 generates radio resource configuration information (RRC information elements) associated with the AU 1201. The assistance information for the generation of radio resource configuration information associated with the AU 1201 may include at least one information among DL/UL hardware (or software) load indicator information (e.g. low load, medium load, and high load) of the AU 1201, a UL/DL GBR/non-GBR/total PRB usage as radio resource state information, available capacity information (e.g. composite available capacity information), UL interference overload indication, UL high interference indication, and almost-blank subframes (ABS) information.

For another example, the AU 1201 may transfer control information, received from any UE via a cell associated therewith, to the CU 1202. The control information that the AU 1201 transfers to the CU 1202 may include at least one information among physical layer control information (PUCCH), MAC control information (MAC CE), and RLC control information (RLC control PDU).

In a further example, the CU 1202 may request and receive RRC_AU_part, generated by the AU 1201, from the AU 1201 to generate a final RRC message. The CU 1202 may generate the final RRC message, including RRC_AU_part received from the AU 1201 and RRC_CU_part generated by the CU 1202, and transfer the final RRC message to the UE 1200 via the AU 1201.

Figure 13:
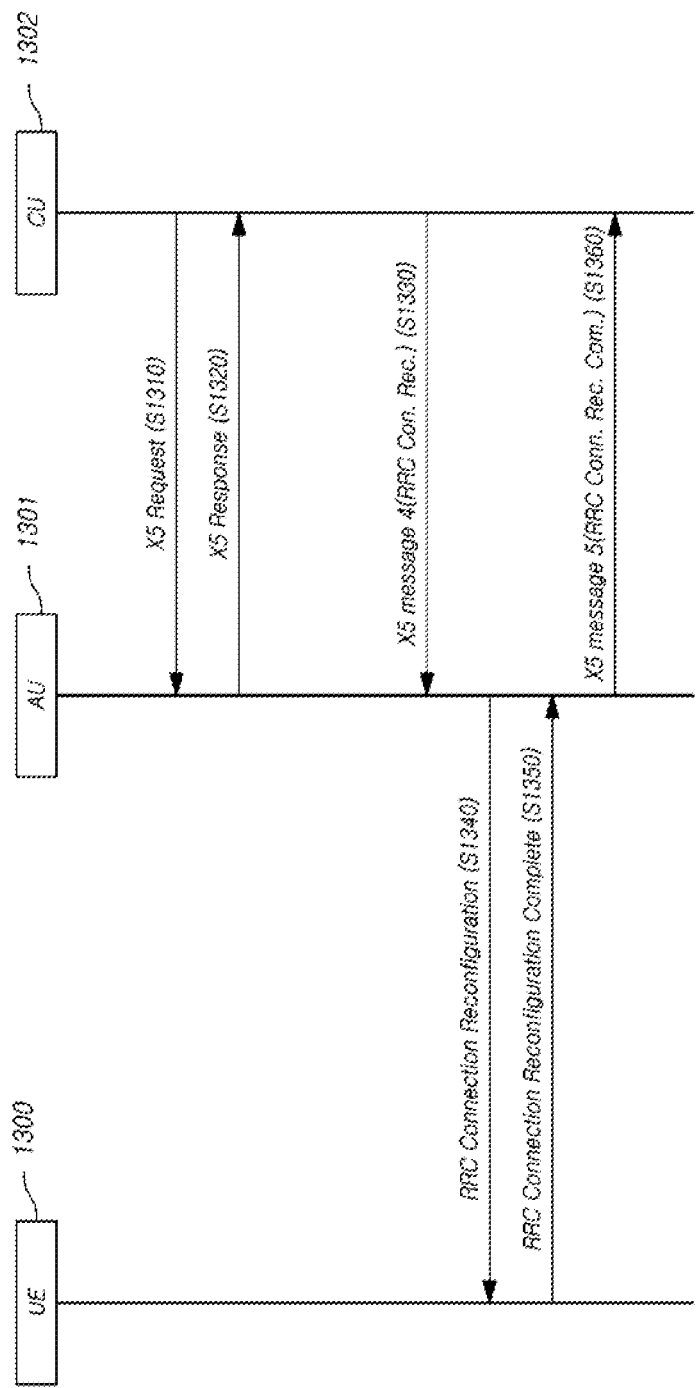
FIG. 13 illustrates another exemplary connection procedure in the radio access network separation structure according to the present disclosure.

An X5 signaling procedure, as will be illustrated in FIG. 13, may be performed so that the CU 1202 may generate RRC_AU_part or receive RRC_AU_part generated by the AU 1201. This procedure will be described in detail with reference to FIG. 13.

FIG. 13 illustrates a connection procedure in a radio access network separation structure according to another embodiment of the present disclosure.

A CU 1302 may generate an RRC reconfiguration message and transfer the RRC reconfiguration message to a UE 1300 via an AU 1301, due to any reason, such as a modification of the PDCP configuration or a handover between cells associated with the AU 1301.

In S1310, the CU 1302 may transmit an X5 request message to request the AU 1301 to generate RRC_AU_part or to transmit RRC_AU_part. The X5 request message may include at least one information among radio bearer context (e.g. a radio bearer-specific E-RAB ID, E-RAB QoS parameters, a transport layer address, and a GTP-TEID), a security key, UE radio capability, UE security capability, a C-RNTI, a radio bearer-specific logic channel identifier, and information indicating an RRC_AU_part request.

In S1320, the AU 1301 that has received the X5 request message may generate information, based on which RRC_AU_part is to be generated, or RRC_AU_part itself, and send the generated information or RRC_AU_part by including the generated information or RRC_AU_part in an X5 response message. The information, based on which RRC_AU_part is to be generated, is assistance information for the generation of radio resource configuration information associated with the AU 1201, and the information may include at least one information among a DL/UL hardware (or software) load indicator information (e.g. low load, medium load, and high load) of the AU 1301, a DL/UL GBR/non-GBR/total PRB usage as radio resource state information, available capacity information (e.g. composite available capacity information), physical layer control information (PUCCH), MAC control information (MAC CE), and RLC control information (RLC control PDU).

Afterwards, the CU 1302 generates a final RRC message using the information for the generation of received RRC_AU_part or using RRC_AU_part and RRC_CU_part. In S1330, the CU 1302 transfers X5 message 4, including the final RRC message, to the AU 1301.

In S1340, the AU 1301 transfers an RRC connection reconfiguration message, including the received final RRC message, to the UE 1300.

In S1350, the UE 1300 reconfigures the RRC connection using information in the received RRC connection reconfiguration message and transfers an RRC connection reconfiguration complete message to the AU 1301. In S1360, the AU 1301 transfers the RRC connection reconfiguration complete message to the CU 1302.

The steps S1330 to S1360 may operate similarly to the steps S1270 to S1295 described above with reference to FIG. 12.

FIG. 14 illustrates a connection procedure in a radio access network separation structure according to further another embodiment of the present disclosure. Referring to FIG. 14, as described above, a final RRC message may be generated in an AU 1401.

As illustrated above in FIG. 10, the AU 1401 may terminate an RRC received from a UE 1400. Alternatively, the AU 1401 may generate a final RRC message by itself and transmit the generated final RRC message to the UE 1400.

Alternatively, the AU 1401 may request RRC_CU_part and transmit an RRC connection reconfiguration message, including RRC_CU_part received from a CU 1402, to the UE 1400.

The UE 1400 may perform an RRC connection setup procedure with the AU 1401. For example, in S1410, the UE 1400 transmits an RRC connection request message to the AU 1401. Afterwards, in S1420, the UE 1400 receives an RRC connection setup message from the AU 1401.

In S1430, the UE 1400 transmits an RRC connection setup complete message to the AU 1401.

In an example, in S1440, the AU 1401 that has received the RRC connection setup complete message forwards a non-access stratum (NAS) message (e.g. an attach request) to the CU 1402 via a connection request message. The connection request message may be a message for requesting RRC_CU_part or may include indication information regarding RRC_CU_part. The CU 1402, may receive a message (e.g. an initial context setup request message) for the setup of initial UE context, including radio bearer context (an E-RAB ID, E-RAB QoS parameters, a transport layer address, and a GTP-TEID), a security key, UE radio capability, UE security capability, or the like, by signaling with a core network. In S1450, the CU 1402 sends a connection response message to the AU 1401. The connection response message may include at least one information among radio bearer context (e.g. an E-RAB ID, E-RAB QoS parameters, a transport layer address, and a GTP-TEID), a security key, UE radio capability, UE security capability, a C-RNTI, and a radio bearer-specific logic channel identifier. The connection response message, sent to the AU 1401 by the CU 1402, may include RRC_CU_part. RRC_CU_part may include radio bearer-specific PDCP configuration information (PDCP-Config). Alternatively, RRC_CU_part may include configuration information regarding at least one of radio bearer-specific header compression (e.g. header compression and decompression of IP data flows using robust header compression (ROHC) protocol) and PDCP sequence number.

In S1460, the AU 1401 sends an RRC connection reconfiguration message, including RRC_CU_part received from the CU 1402, to the UE 1400. Alternatively, in S1460, the AU 1401 sends an RRC connection reconfiguration message, including RRC_CU_part received from the CU 1402 and RRC_AU_part generated by the AU 1401, to the UE 1400.

In S1470, the AU 1401 receives an RRC connection reconfiguration complete message from the UE 1400. When the RRC connection reconfiguration complete message is received from the UE 1400, in S1480, the AU 1401 may transfer a connection confirmation message to the CU 1402, thereby notifying the UE 1400 has successfully completed the reconfiguration procedure.

For another example of the steps S1440 to S1480, the AU 1401 that has received the RRC connection setup complete message sends a connection request message to the CU 1402 to request at least one information among radio bearer context, a security key, UE radio capability, and UE security capability maintained by the CU 1402. The connection request message sent to the CU 1402 by the AU 1401 may be a message for requesting RRC_CU_part or may include indication information regarding RRC_CU_part.

In S1450, the CU 1402 sends a connection response message to the AU 1401. The connection response message may include at least one of information among radio bearer context (e.g. an E-RAB ID, E-RAB QoS parameters, a transport layer address, and a GTP-TEID), a security key, UE radio capability, UE security capability, a C-RNTI, and a radio bearer-specific logic channel identifier. The connection response message, sent to the AU 1401 by the CU 1402, may include RRC_CU_part. RRC_CU_part may include radio bearer-specific PDCP configuration information (PDCP-Config). Alternatively, RRC_CU_part may include configuration information regarding at least one of radio bearer-specific header compression (e.g. header compression and decompression of IP data flows using ROHC protocol) and PDCP sequence number.

In S1460, the AU 1401 sends an RRC connection reconfiguration message, including RRC_CU_part received from the CU 1402, to the UE 1400. Alternatively, in S1460, the AU 1401 sends an RRC connection reconfiguration message, including RRC_CU_part received from the CU 1402 and RRC_AU_part generated by the AU 1401, to the UE 1400.

In S1470, the AU 1401 receives an RRC connection reconfiguration complete message from the UE 1400. In S1480, the AU 1401 may transfer a connection confirmation message to the CU 1402, thereby notifying the UE 1400 has successfully completed the reconfiguration procedure.

FIG. 15 illustrates a connection procedure in a radio access network separation structure according to further still another embodiment of the present disclosure.

As illustrated above in FIGS. 7 and 8, when a UE 1500 has set up an initial RRC connection to an eNB 1503, the UE 1500 may transmit user plane data via a cell provided via an AU 1501. That is, the UE 1500 may transmit the user plane data via the AU 1501 and a CU 1502.

In this case, S1510, the eNB 1503 may send a signaling message Xm message 1 on an interface between the eNB 1503 and the CU 1502 (hereinafter, referred to as "Xm-C" for convenience of description) to add and use radio resources of the AU 1501. The signaling message Xm message 1 requests the radio resources of the AU 1501 to be added. For example, in S1520, the CU 1502 sends X5 message 6 to the AU 1501 for the configuration of an entity provided by the AU 1501 or to request RRC_AU_part. The X5 message 6 may include at least one information among radio bearer context (e.g. a radio bearer-specific E-RAB ID, E-RAB QoS parameters, a transport layer address, and a GTP-TEID), a security key, UE radio capability, UE security capability, a C-RNTI, and a radio bearer-specific logic channel identifier.

The AU 1501 may perform acceptance control.

In S1530, the AU 1501 that has received X5 message 6 may generate RRC_AU_part and send RRC_AU_part via an X5 message 7, which includes RRC_AU_part.

The AU 1501 may set up a corresponding radio bearer-specific entity (or a protocol entity or RLC/MAC/PHY) according to received information and generated RRC_AU_part.

In S1540, the CU 1502 sends a response/confirmation message (e.g. Xm message 2) to the eNB 1503.

The eNB 1503 sends an RRC connection reconfiguration message to the UE 1500 in S1550, and receives a complete message in response to the RRC connection reconfiguration message in S1560.

FIG. 16 illustrates SRB types and RRC messages of E-UTRAN.

The method of separately transferring control plane data and user plane data according to bearers, between the AU and the CU by association and mapping, has been described with reference to FIGS. 12 to 15, with regard to the RRC connection procedure and the RRC reconfiguration procedure. However, this is merely for convenience of description; a UL or DL RRC message, as included in FIG. 16, may be transferred via the AU or the CU in a manner the same as or similar to the above-described operation. For example, the priority of SRB2 is lower than the priority of SRB1. A signaling bearer, such as a DL information transfer message or a UL information transfer message, configured by the E-U IRAN after security activation may correspond thereto.

The above-described embodiments according to the present disclosure may be used alone or in combination. In the present disclosure, the logic channels, the signaling bearers, and the data bearers, provided by the E-UTRAN, have been described by way of example. However, this is merely for convenience of description, and the same is applicable to logic channels, signaling bearers, and data bearers provided by next-generation radio access networks having the same or similar functions. The same is also applicable when the logic channels, signaling bearers, and the data bearers provided by the E-UTRAN and the logic channels, the signaling bearers, and the data bearers provided by the next-generation radio access networks are used together.

According to the present disclosure as described above, it is possible to separately transmit and receive data according to UEs or bearers by RRC signaling between nodes configured by dividing base station (eNB) functions or between a base station and a node configured by dividing base station functions. It is therefore possible to effectively transmit or receive a plurality of bearers. This can consequently reduce costs for constructing a backhaul between nodes configured by dividing base station functions or between a base station and a node configured by separating a base station function.

Hereinafter, a configuration of an access unit able to perform the above-described embodiments of the present disclosure will be briefly described with reference to FIG. 17.

Figure 17:
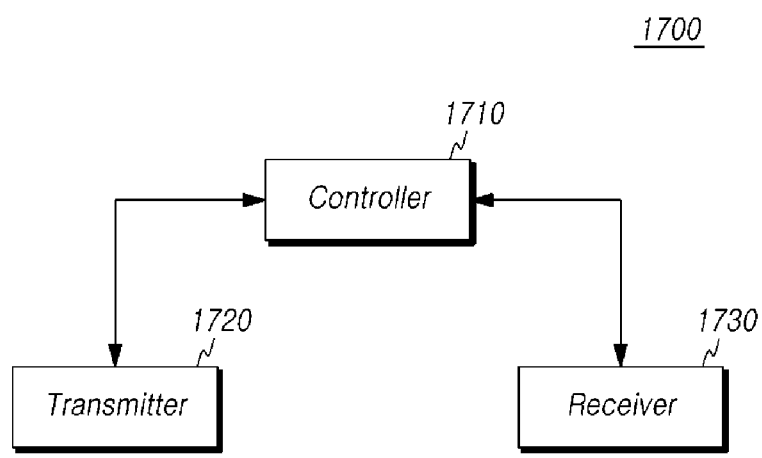
FIG. 17 illustrates a configuration of an access unit according to another embodiment of the present disclosure.

FIG. 17 illustrates a configuration of an access unit according to an embodiment of the present disclosure.

Referring to FIG. 17, the access unit 1700 includes a transmitter 1720 transmitting a first message, including a UL RRC message received from a UE, to a central unit. The first message may include UE identification information or radio bearer identification information, based on which the central unit separately transmits data according to the radio bearers. The transmitter 1720 may transmit a DL RRC message to the UE. According to the embodiments of the present disclosure, the transmitter 1720 may transmit each X5 message to the central unit or a DL RRC message to the UE.

The access unit 1700 includes a receiver 1730 receiving a second message, including the DL RRC message, from the central unit. The second message may include UE identification information or radio bearer identification information, based on which the access unit separately transmits data according to the radio bearers. The receiver 1730 may receive the UL RRC message, such as an RRC connection request message, an RRC connection setup message, or an RRC connection reconfiguration complete message, from the UE as required, according to the foregoing embodiments of the present disclosure.

The access unit 1700 may include a controller 1710 controlling a message transmitting and receiving operation between the central unit and the UE and an operation of generating an entirety or a portion of RRC information, necessary for the implementation of the present disclosure.

The controller 1710 may generate radio resource configuration information of the UE. In this case, the second message, received by the receiver 1730, may include radio resource configuration information of the central unit. The radio resource configuration information of the central unit may include RRC configuration information associated with the central unit. Alternatively, the radio resource configuration information of the central unit may include at least one information among radio bearer-specific header compression configuration information, PDCP sequence number configuration information, and PDCP configuration information.

In addition, the controller 1710 controls the overall operation of the access unit necessary for the implementation of embodiments of the present disclosure, in accordance with the provision of an improved cost-effective radio access network structure able to reduce backhaul costs and a specific signaling procedure for the radio access network structure.

Furthermore, the transmitter 1720 and the receiver 1730 are used to transmit and receive signals, messages, and data, necessary for the implementation of the embodiments of the present disclosure, to and from the UE or the central unit.

In addition, the central unit may also include configurations, such as a transmitter, a receiver, and a controller, necessary for the implementation of the embodiments of the present disclosure.

The terms "system," "processor," "controller," "component," "module," "interface,", "model," "unit" or the like are generally intended to refer to a computer-related entity, either hardware, a combination of hardware and software, software, or software in execution. For example, a component may be, but is not limited to being, a process running on a processor, a processor, a controller, a control processor, an object, an executable, a thread of execution, a program, and/or a computer. By way of illustration, both an application running on a controller or processor and the controller or processor can be a component. One or more components may reside within a process and/or thread of execution and a component may be localized on one computer and/or distributed between two or more computers.

The foregoing descriptions and the accompanying drawings have been presented in order to explain the certain principles of the present invention. A person skilled in the art to which the invention relates can make many modifications and variations by combining, dividing, substituting for, or changing the elements without departing from the principle of the invention. The foregoing embodiments disclosed herein shall be interpreted as illustrative only but not as limitative of the principle and scope of the invention. It should be understood that the scope of the invention shall be defined by the appended Claims and all of their equivalents fall within the scope of the invention.

CROSS REFERENCE TO RELATED APPLICATION

This application claims priority from and the benefit under 35 U.S.C. § 119(a) of Korean Patent Application No. 10-2015-0099891, filed on Jul. 14, 2015, which is hereby incorporated by reference for all purposes as if fully set forth herein. In addition, when the present application claims priority in any nation other than the United States for the same reason above, all disclosures are incorporated herein for all purposes by this reference.

The invention claimed is:

1. A method of configuring, by an access unit, a wireless connection of a terminal, the method comprising:
receiving an uplink radio resource control (RRC) message from a terminal, including the uplink RRC message into a first message, and transmitting the first message to a central unit;
receiving a second message from the central unit, where the second message includes a downlink RRC message in response to the uplink RRC message from the terminal; and
transmitting the downlink RRC message to the terminal, wherein the access unit and the central unit distinguish signaling radio bearers based on radio bearer identification information-included in the first message and the second message.

2. The method according to claim 1, wherein
the access unit comprises a node configured to provide an RLC function, a MAC function, and a PHY function, for transmission of user plane data, and
the central unit comprises a node configured to provide a PDCP function, for transmission of the user plane data.

3. The method according to claim 1, wherein the first message comprises at least one of an RRC connection request message received from the terminal and a C-RNTI.

4. The method according to claim 1, wherein the second message comprises at least one of an RRC connection setup message, a C-RNTI, and signaling radio bearer identification information.

5. The method according to claim 1, wherein the first message includes an RRC connection setup complete message, and the second message includes at least one of an RRC connection reconfiguration message and a security mode command message.

6. The method according to claim 5, wherein the first message includes SRB1 signaling radio bearer identification information.

7. The method according to claim 5, wherein the second message includes at least one of radio bearer identification information and QoS parameter information, for setup of terminal context.

8. An access unit for configuring a wireless connection of a terminal, comprising:
a transmitter configured to transmit a first message to a central unit, where the first message includes an uplink RRC message received from a terminal; and
a receiver configured to receive a second message from the central unit, where the second message includes a downlink RRC message in response to the uplink RRC message from the terminal,
wherein the transmitter transmits the downlink RRC message to the terminal, and
wherein the access unit and the central unit distinguish signaling radio bearers based on radio bearer identification information included in the first message and the second message.

9. The access unit according to claim 8, wherein
the access unit comprises a node configured to provide an RLC function, a MAC function, and a PHY function, for transmission of user plane data, and
the central unit comprises a node configured to provide a PDCP function, for transmission of the user plane data.

10. The access unit according to claim 8, wherein the first message comprises at least one of an RRC connection request message received from the terminal and a C-RNTI.

11. The access unit according to claim 8, wherein the second message comprises at least one of an RRC connection setup message, a C-RNTI, and signaling radio bearer identification information.

12. The access unit according to claim 8, wherein the first message includes an RRC connection setup complete message, and the second message includes radio resource configuration information of the central unit an RRC connection reconfiguration message or a security mode command message.

13. The access unit according to claim 12, wherein the first message includes SRB1 signaling radio bearer identification information.

14. The access unit according to claim 12, wherein the second message includes at least one of radio bearer identification information and QoS parameter information.

* * * * *